United States Patent

Belliot

[11] Patent Number: 5,261,146
[45] Date of Patent: Nov. 16, 1993

[54] CREPING MACHINE

[75] Inventor: Claude Belliot, Pantin, France

[73] Assignee: Isover Saint-Gobain, Courbevoie, France

[21] Appl. No.: 862,379

[22] Filed: Apr. 2, 1992

[30] Foreign Application Priority Data

Apr. 4, 1991 [CH] Switzerland .................. 1000/91

[51] Int. Cl.$^5$ ............................................. D06C 21/00
[52] U.S. Cl. ............................. 26/18.6; 34/152; 34/156; 226/97
[58] Field of Search .............. 26/18.5, 18.6, 97, 99, 26/106; 28/134, 136, 137, 165; 34/155, 156, 161, 152; 226/7, 97; 264/282

[56] References Cited

U.S. PATENT DOCUMENTS

| 1,751,471 | 3/1930 | Campbell | 26/18.6 |
| 1,817,855 | 8/1931 | Spuhr | 26/18.6 |
| 1,944,001 | 1/1934 | Cluett | 26/18.6 |
| 1,971,211 | 8/1934 | Cluett | 26/18.6 |
| 2,335,313 | 11/1943 | Rowe et al. | 26/18.6 |
| 2,409,066 | 10/1946 | Powell et al. | |
| 2,582,241 | 1/1952 | Dungler | 34/156 |
| 2,590,849 | 4/1952 | Dungler | 34/156 |
| 3,287,815 | 11/1966 | Yunghahn | 34/155 |
| 3,800,432 | 4/1974 | Miyata et al. | 34/152 |
| 3,873,013 | 3/1975 | Stibbe | 34/156 |
| 4,146,946 | 4/1979 | Plaia et al. | 26/18.5 |
| 4,219,942 | 9/1980 | Coliva | 34/155 |
| 4,345,385 | 8/1982 | Sando et al. | 34/155 |
| 4,932,139 | 6/1990 | Lehtinen | 34/152 |

FOREIGN PATENT DOCUMENTS

| 469335 | 11/1946 | Belgium . |
| 0133083 | 7/1984 | European Pat. Off. . |
| 1281765 | 10/1968 | Fed. Rep. of Germany . |
| 88527 | 5/1958 | Netherlands . |

Primary Examiner—Clifford D. Crowder
Assistant Examiner—Amy B. Vanatta
Attorney, Agent, or Firm—Oblon, Spivak, McClelland, Maier & Neustadt

[57] ABSTRACT

Between the two runs of each conveyor (17, 17') of a pair of conveyors of a creping machine are provided an airtight chamber (22, 22') of which one large face, disposed substantially in contact with an operating end of this conveyor, is formed by a perforated rigid plate (23, 23'). Ducts (26, 26') are provided for supplying compressed air to each chamber (22, 22'). By escaping via the perforations in these plates (23, 23') this air produces an air cushion between each plate and the active part of the conveyor (17, 17'), the effect of which air cushion is to decrease considerably the resistance to the sliding of this conveyor (17, 17') over this plate (23, 23'). This arrangement greatly reduces stresses in the conveyors, which enables larger mats to be creped easily and the construction to be simplified.

7 Claims, 3 Drawing Sheets

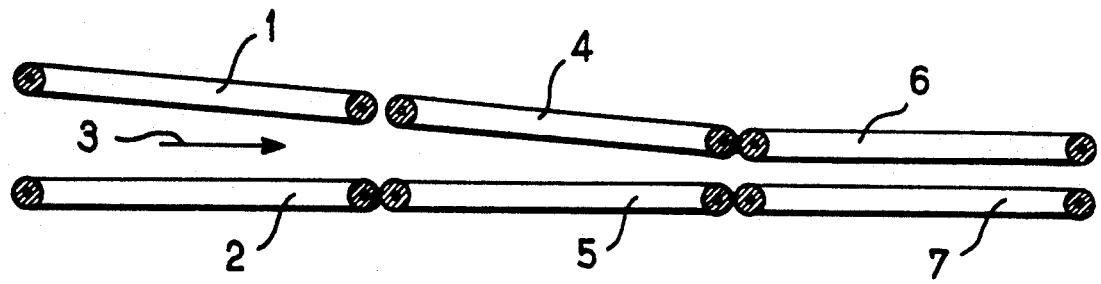
FIG_1
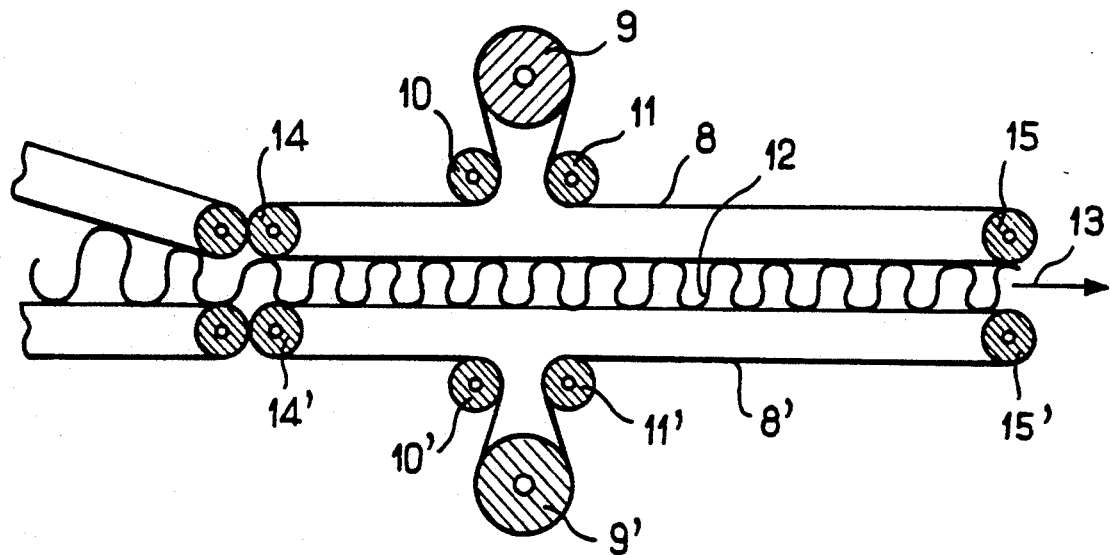
FIG_2
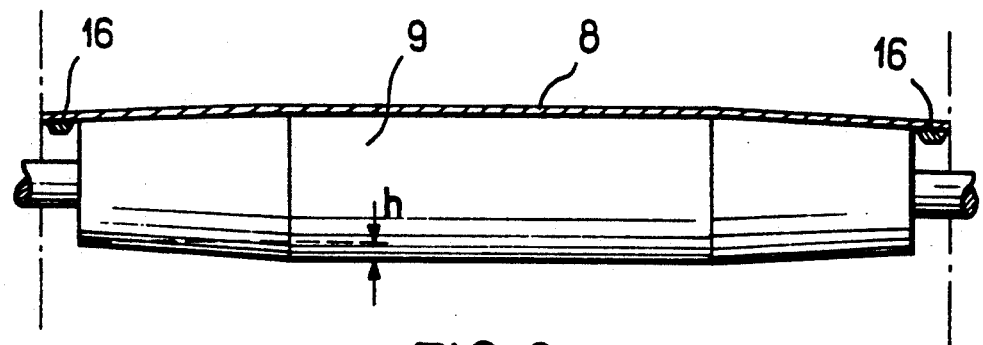
FIG_3

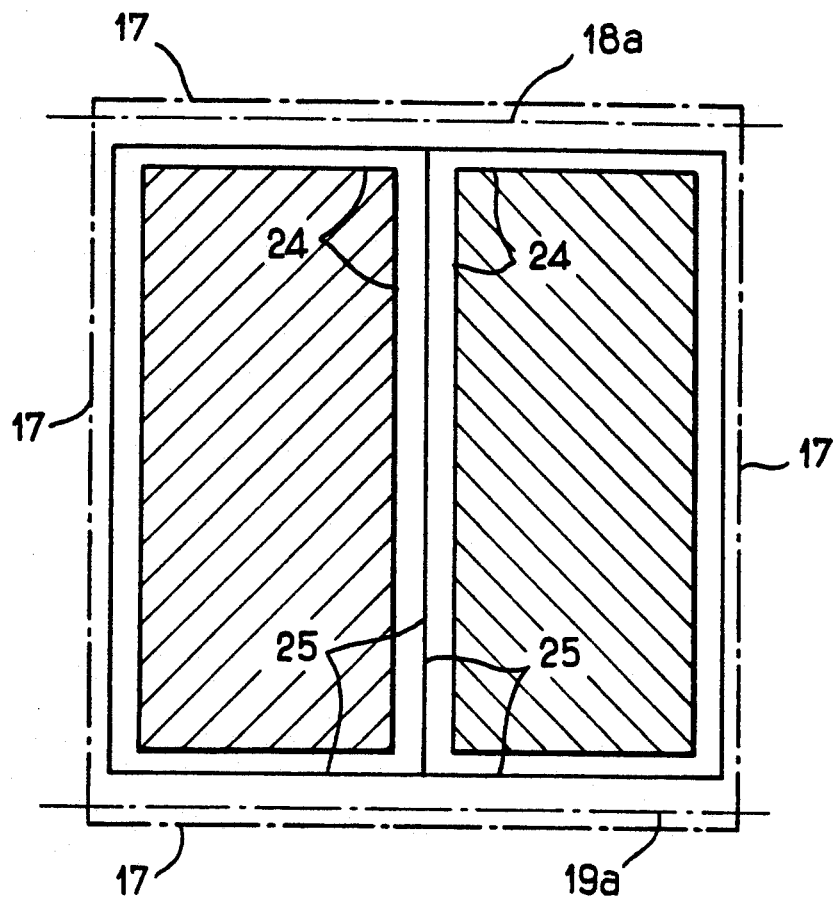
FIG_6
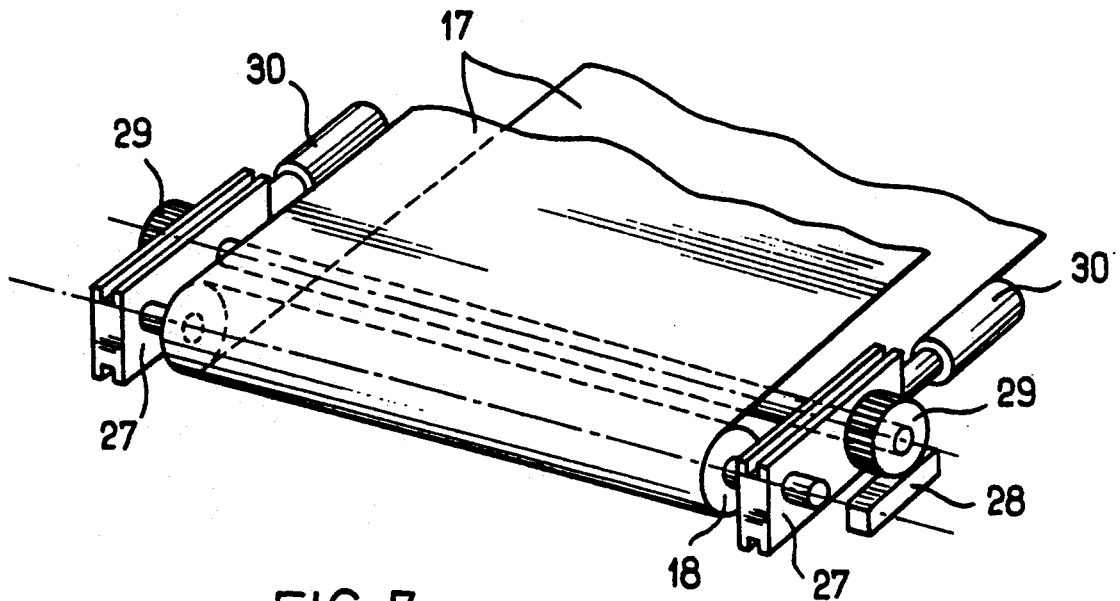
FIG_7

CREPING MACHINE

BACKGROUND OF THE INVENTION

1. Field of the Invention

The present invention is directed to creping machines installed between a mat reception and shaping hood and a polymerizing oven.

2. Description of the Related Art

Creping machines are installations of which the aim is to rearrange the fibers in a mat of mineral wool fibers sized with a non-polymerized binder. The creping machine is installed between the mat reception and shaping hood and the binder polymerizing oven. In principle it comprises at least one pair of continuous conveyors with superimposed belts. It is intended to alter the orientation and arrangement of the mineral wool mat fibers which pass over it, generally by means of compression, not only of the thickness but also of the length of the product. Longitudinal compression is produced by reducing the velocity by which the mat passes between the successive reception, creping and oven conveyors.

The creping machine may comprise one or more pairs of conveyors. For example if there are three pairs, the first pair can be synchronous with the mineral wool mat reception velocity and the third pair synchronous with the advance of the mat in the oven, while the second pair can be regulated at an intermediate velocity, depending on the product manufactured.

FIG. 1 illustrates the principle of a known type of creping machine. The gap between a first pair of continuous conveyors 1 and 2 decreases as a mineral wood mat (not shown) passes between them in the direction of the arrow 3. A second pair of continuous conveyors 4 and 5 converge in an extension of conveyors 1 and 2. These two pairs of conveyors 1-5 compress the mineral wool mat in the direction of its thickness. The drive velocity of the second pair of conveyors 4, 5 is slower than that of the first pair 1, 2, which results in longitudinal compression of the mat.

A third pair of conveyors 6, 7 follows the second pair 4, 5 and moves at a slower velocity than that of this second pair. The distance between the active runs of the conveyors 6, 7 is constant. This third pair 6, 7 thus increases only the longitudinal compression of the mat.

Taking this principle as a starting point, conveyor belts were initially used in a creping machine producing a 1.2 m wide mat. The belts were of the type known by the name of "TISSMETAL". These belts are made entirely of metal and designed with two roller drive chains, one on each edge. These two chains are connected transversely to metal bars by means of special attachments. The belt itself consists of metal woven about transverse bars. These belts are driven by pinions acting on the two chains of which one is located on each edge. In order to absorb and support the compression stresses resulting from the progressive crushing of the mineral wool mat between the belts, the woven metal rubs against the steel sliding tables.

The major drawbacks of these metal conveyors are: a) restriction of the continuous running velocity to 40 m/min with peaks which may reach 50 m/min depending on the supplier; experience has shown that the operation of these conveyors at velocities of this type causes an enormous amount of vibration and results in the frequent breaking of the transverse bar mountings; b) large-scale fouling of the woven metal by the sized fibers, hence awkward cleaning of the machine with pressurized water whenever it has been used; c) considerable maintenance work of the chain mechanism drive system of these conveyors owing to oxidation, fouling and vibrations.

In order to avoid these disadvantages and in particular to operate and produce at higher speeds, the metal belts have been replaced by conveyor belts made from synthetic materials, for example "SIEGLING" belts, the width of the mineral wool mat still being 1.2 m.

The average diameter of the creping machine conveyor rollers must be as small as possible and in any case restricted to 125 mm in order to avoid damaging the creped product. In effect, the mat must pass from one conveyor to another over a distance which is very small so as not to interrupt the creping effect in the product. It is evident that increasing the diameter of adjacent rollers means a larger void when the product passes from one conveyor to another.

This constraint imposed by the roller diameter restricts the surface area available for driving the conveyor belts. In view of the existing constraints on belts (pressure of the mineral wool creped product assessed as being 500 daN/m$^2$), the diameter of the smooth steel drive roller should be at least 160 mm. Since this value is incompatible with what has been stated above, it was necessary to provide an arrangement as shown in FIG. 2, where only the end of the second pair of conveyors and the third pair are illustrated in order to show the conveyor belt drive means which are the same for all three pairs of conveyors.

The belt 8 is driven by a steel drive drum 9 which is 153 mm in diameter and covered with rubber with a shore hardness of approximately 80° to 90°, in order for there to be a high friction coefficient between the drum 9 and the belt 8.

In order to ensure that the belt 8 is driven correctly, two tension rollers 10, 11 have to be provided in this case. At 12 there is illustrated schematically the creped mineral wool mat ready to pass, along direction 13, into the polymerization oven which is not shown. Two roller 14 and 15 return the belt 8 and have a maximum diameter of 125 mm for the reason indicated above.

A belt 8', disposed symmetrically to 8, completes the third pair of conveyors. It is driven by a drive roller 9', identical to 9, and passes over two tension rollers 10', 11', identical to 10 and 11, and about two return rollers 14', 15', identical to 14 and 15.

In order to improve the guiding of the belt 8 or 8' respectively, the drive drum 9, or 9' respectively, is machined so as to be cylindrically conical (FIG. 3) and the belts 8, 8' have trapezoidal projections 16 running along their edges. The belt 8, 8' is adequately guided so long as the deflection of the drive drum 9 is less than the height h corresponding to the conicity of this drum.

In order to withstand the compression stresses resulting from the progressive crushing of the product between the belts 8 and 8', the conveyor belts 8 and 8' rub against steel sliding belts which are not illustrated in FIG. 2.

The major drawback of this embodiment is the considerable fouling of the two tension rollers 10, 11, 10', 11' whose surfaces are in contact with the faces of the belts 8, 8' which come into contact with the sized fibers forming the mat 12. In effect, these two tension rollers are therefore covered with sized fibers and become deformed, which causes increased stresses in the belts 8, 8', hence their misalignment. The belts are thus no longer guided and ultimately they tear. The width of the mineral wool mat hitherto was thus restricted to a maximum of 1.2 m.

SUMMARY OF THE INVENTION

The present invention has as an object to avoid all the aforementioned disadvantages of such earlier constructions and, moreover, to enable a creping machine to be provided which is not restricted to a mat width of 1.2 m and allows this width to be doubled without any disadvantage.

According to a feature of the invention, the above and other objects are carried out by a creping machine for a sized fiber mat, comprising at least one pair of continuous conveyors, the conveyors of each pair having active runs facing one another to form a gap for the passage of a sized fiber mat. Each conveyor comprises a smooth continuous belt made of flexible material. At least one stationary rigid plate is positioned adjacent the active run of each of the conveyors, and at a side of the active run opposite the gap, so as to support the active run. Means are provided for forming and maintaining an air cushion between the stationary plate and the active run, thereby reducing the sliding resistance of the conveyors on the stationary plate. Means are also provided for driving at least one of the conveyors so as to pass a sized fiber mat through the gap and compress the mat.

According to another feature of the invention, there are at least three such pairs of conveyors arranged end to end and driven such that a sized fiber mat is successively passed through the gaps between the pairs of conveyors in an upstream to downstream direction. The thickness of the gap of at least one of the pairs of conveyors is progressively reduced from an upstream toward a downstream end of the gap so as to compress the mat thickness. At least one of the pairs of conveyors has a driven speed less than that of the pair of conveyors immediately upstream thereto so that the mat is longitudinally compressed.

According to a further feature of the invention, the conveyor belts are non-metallic.

According to a further feature of the invention, the air cushion forming means comprise an air-tight chamber defined in part by the plate, together with means for supplying compressed air to the chamber, and a plurality of perforations in the plate. The compressed air passing through the perforations forms the air cushion.

According to yet further features of the invention, the perforations are not formed in portions of each of the plates adjacent lateral edges of the corresponding belt, and each chamber is disposed in a space between the runs of a corresponding conveyor. Means are also provided for setting an initial tension on each belt and maintaining the tension during operation of the machine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 and 3 schematically illustrate conventional devices;

FIG. 6 is a partial schematic plan view corresponding to FIGS. 4 and 5; and

FIG. 7 is a perspective view illustrating a conveyor tension regulating device for the creping machine according to FIGS. 4 to 6.

DETAILED DESCRIPTION OF THE PREFERRED EMBODIMENT

The general arrangement of the conveyors according to the illustrated embodiment of the invention is similar to that shown in FIG. 1 with the differences which will now be described.

Figure 4:
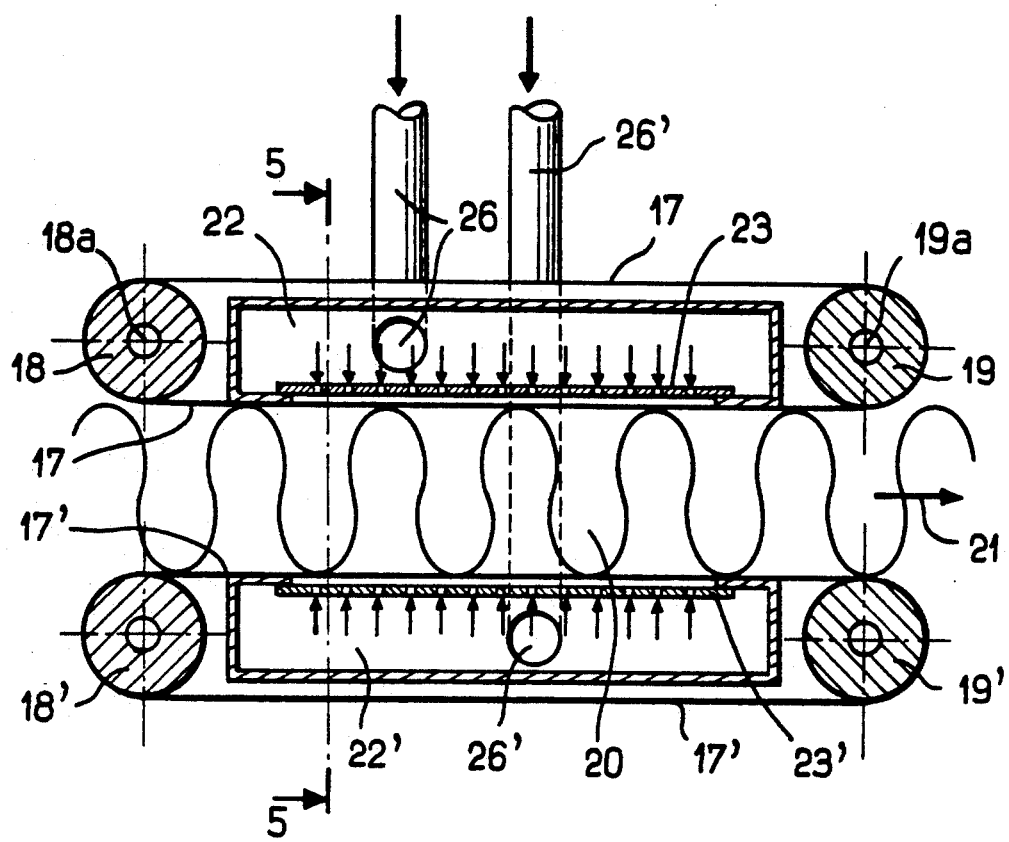
FIG. 4 is a view in longitudinal section of a pair of conveyors of one embodiment of the invention.
Figure 5:
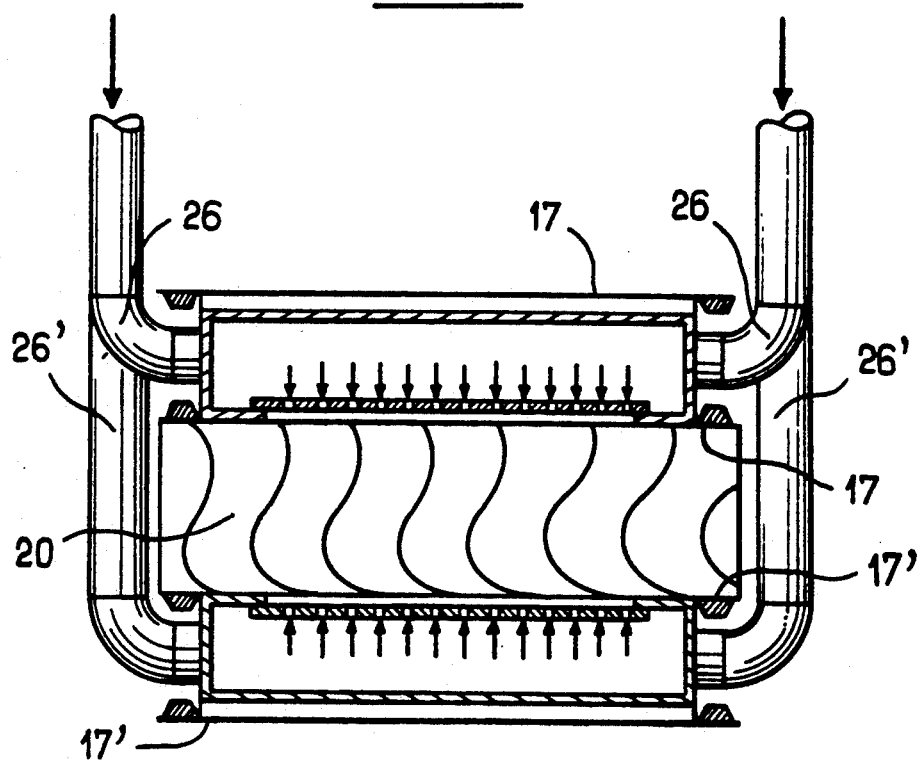
FIG. 5 is a view in cross-section of the pair of conveyors according to FIG. 4.

FIGS. 4 and 5 show in section the third pair of conveyors which are just in front of the entrance to the polymerization oven, it being understood that the two other pairs are constructed in an identical manner.

The upper conveyor belt 17 and the lower conveyor belt 17' of this third pair of conveyors are smooth and made of synthetic material. The belt 17 passes over rollers 18, 19 which drive the belt. Likewise, the symmetrical belt 17' passes over the drive rollers 18', 19'. A sized fiber mat 20 moves in the direction 21 (i.e., upstream to downstream) through the gap between the active runs of the pair of conveyors.

An airtight metal chamber 22 is disposed in the space between the upper and lower runs of the belt 17 and, similarly, an airtight metal chamber 22' is disposed between the upper and lower runs of the conveyor belt 17'.

The lower face of the upper chamber 22 is formed primarily by a metal sheet 23 having perforations over its entire surface except for its edge areas opposite the edge areas of the belt 17. The lower chamber comprises a perforated upper plate 23', symmetrical to 23.

Ducts 26 supply the chamber 22 with compressed air. This air emerges from the chamber via the openings in the plate 23 and thus forms an air cushion between this plate and the lower run of the belt 17. Ducts 26' likewise supply compressed air to the chamber 22'.

The arrangement is symmetrical as regards the lower belt 17' and the chambers 22'. The air emerging from the chamber 22' forms an air cushion between the perforated belt 23' and the upper run of the conveyor belt 17'.

The metal plates 23, 23' maintain the active part of the conveyors 17, 17' passing thereby in the correct form which ensures that the mineral wool mat 20 is compressed correctly. They are rigid in order to resist bending deformation when the mat is compressed from above and below (FIG. 4).

FIG. 6 shows the arrangement in plan view. For practical reasons, the chamber 22 is formed of two contiguous rectangular chambers of which the periphery is illustrated in plan view at 25. For example, the use of two chambers permits greater rigidity for the metal sheet 23 than would be the case for one large chamber.

The perforations in the plate 23 of each chamber 22 are distributed inside hatched rectangles 24 stopping at a slight distance from the edges of the corresponding belt 17, as can be seen in FIG. 6.

The perforations may be approximately 5 mm in diameter and disposed in a staggered manner along the straight lines. In the direction parallel to the length of the belt 17, the perforations are centered approximately 30 mm away from each other and in the perpendicular direction they are centered approximately 20 mm away from each other.

Owing to the air cushions, the resistance to displacement of the belts 17, 17' along the plates 23, 23' is considerably reduced, while the desired pressure of the belts 17, 17' on the mat 20 is maintained. The decrease in this resistance is such that the diameter of the rollers 18, 19, 18', 19' can remain at the limit of 125 mm while the maximum width of the mat can be doubled and easily increased to 2.40 m without causing excessive tension in the belts 17, 17', which is a considerable advantage with respect to previous creping machines.

It should be noted that the considerable decrease in the friction forces has several other advantages. It enables the drive drum (9 in FIG. 2) and the tension rollers to be dispensed with, which overcomes the problems connected with the fouling of these rollers and simplifies construction.

In order that the belts are driven correctly, it is provided (FIG. 7) that an initial tension be applied to the conveyor belts. Such initial tension of the belt is to be kept within a range recommended by the manufacturer. It is therefore important to maintain this initial tension but in such a way that it cannot be exceeded, so as to avoid tearing the belt.

This situation can be achieved by means of a movable tension roller 18 mounted on a resilient system enabling it to respond if the diameter of a roller increases or if the belt expands owing to the effect of the temperature of the polymerization oven.

In order to ensure that the tension roller moves parallel (translation), its bearings are supported by plates 27 sliding in slideways which are not illustrated. The slideways are mechanically mounted to racks 28 by pinions 29 which are rotatably mounted to the slides and mesh with the pinions. The tension in the belt is produced by two pneumatic or hydraulic jacks 30 acting on each of the slideways 27 of the tension roller 18. Adjustment of the pressure in the hydraulic jacks makes the plates 27 move while rotating the pinions.

The arrangement of the airtight chambers such as 22 between the two runs of each drive belt is identical in each of the conveyor pairs, the only difference being that as the three upper conveyers may be disposed obliquely according to the production data, the face of each upper conveyor formed by a perforated metal sheet is inclined in the same manner as the run of the drive belt with which it cooperates in order to form the air cushion. The airtight chambers 22 are thus completely integral with their respective belts, irrespective of the inclination of the conveyor.

The perforations in the perforated plate 23, 23' do not extend as far as the edges of the belt in order to avoid compressed air loss.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A creping machine for a sized fiber mat, comprising:
    at least one pair of continuous conveyors, the conveyors of each said pair having active runs which respectively have one sides facing one another to form a gap between the one sides of the active runs for the passage of a sized fiber mat between the conveyors, each said conveyor comprising a smooth continuous belt made of flexible material;
    at least one stationary rigid plate positioned adjacent the active run of each said conveyors and being located at another side of each said active run opposite said one side forming the gap, so as to support the active run during passage of the mat;
    means for forming and maintaining an air cushion between each said stationary plate and a corresponding said active run, thereby reducing sliding resistances of said conveyor on said stationary plate; and
    means for driving at least one of said conveyors so as to pass a sized fiber mat through said gap in an upstream to downstream direction and compress the mat.

2. The machine of claim 1 including at least three of said pairs of conveyors arranged end to end and driven such that a sized fiber mat is successively passed through the gaps between said pairs of conveyors in the upstream to downstream direction, wherein the thickness of the gap of at least one of said pairs of conveyors is progressively reduced from an upstream toward a downstream end of the gap so as to compress the mat thickness, and wherein at least one of said pairs of conveyors has a driven speed less than that of a pair of conveyors immediately upstream thereto, whereby the mat is longitudinally compressed.

3. The machine of claim 2 wherein said conveyor belts are non-metallic.

4. The machine of claim 2 wherein said air cushion forming means comprise:
    an airtight chamber defined in part by said plate;
    means for supplying compressed air to said chamber; and
    a plurality of perforations in said plate, whereby the compressed air passing through the perforations forms the air cushion.

5. The machine of claim 4 wherein said perforations are not formed in portions of each said plate adjacent lateral edges of a corresponding belt.

6. The machine of claim 4 wherein each said chamber is disposed in a space between the runs of a corresponding conveyor.

7. The machine of claim 1 including means setting an initial tension on each said belt and maintaining the tension during operation of the machine.

* * * * *